United States Patent [19]

Testa, Sr et al.

[11] Patent Number: 4,585,244
[45] Date of Patent: Apr. 29, 1986

[54] BICYCLE IMPROVEMENT

[76] Inventors: Victor Testa, Sr; George Spector, both of 233 Broadway RM 3615, New York, N.Y. 10007

[21] Appl. No.: 642,588
[22] Filed: Aug. 20, 1984
[51] Int. Cl.⁴ .......................................... B62M 11/02
[52] U.S. Cl. .................................. 280/260; 280/259
[58] Field of Search ............................. 280/259, 260

[56] References Cited
U.S. PATENT DOCUMENTS 609,344  8/1898  Harrity ............................... 280/260
632,306  9/1899  Bryant ............................... 280/260
660,448  10/1900 Metz ................................. 280/260

Primary Examiner—John J. Love
Assistant Examiner—Donn McGiehan

[57] ABSTRACT

An improved bicycle is provided and consists of a universal joint connecting the proximal ends of drive shaft sections together for transmitting motion from a crank axle to a drive wheel and bearing blocks mounted transversely across support arms to rotatably hold rear section of the drive shaft in position. In a modification the rear section of the drive shaft is adjustable.

1 Claim, 6 Drawing Figures

BICYCLE IMPROVEMENT

BACKGROUND OF THE INVENTION

The instant invention relates generally to bicycles and more specifically it relates to an improved bicycle, dispensing with the usual drive chain between the crank axle and the drive wheel.

Numerous bicycles have been provided in prior art that are adapted to utilize drive shaft gear mechanisms. For example U.S. Pat. Nos. 660,448; 662,891 and 697,675 all are illustrative of such prior art. While these units may be suitable for the particular purpose to which they address, they would not be suitable for the purposes of the present invention as heretofore described.

SUMMARY OF THE INVENTION

A principle object of the present invention is to provide an improved bicycle that utilizes a drive shaft instead of a drive chain with a universal joint connecting the proximal ends of the drive shaft sections together for transmitting motion from a crank axle to a drive wheel.

Another object is to provide an improved bicycle that utilizes bearing blocks mounted transversely across support arms to rotatably hold rear section of the drive shaft in position.

An additional object is to provide an improved bicycle whereby the rear section of the drive shaft is adjustable.

A further object is to provide an improved bicycle that is simple and easy to use.

A still further object is to provide an improved bicycle that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

DETAILED DESCRIPTION OF THE PREFERRED EMBODIMENTS

Figure 1:
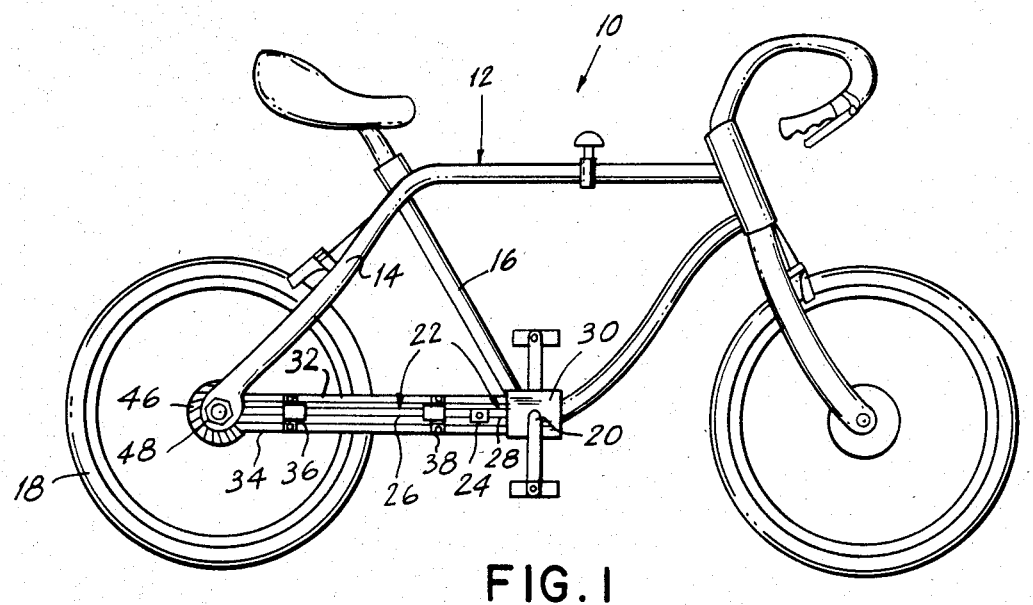
FIG. 1 is a side view of a bicycle embodying the invention.
Figure 2:
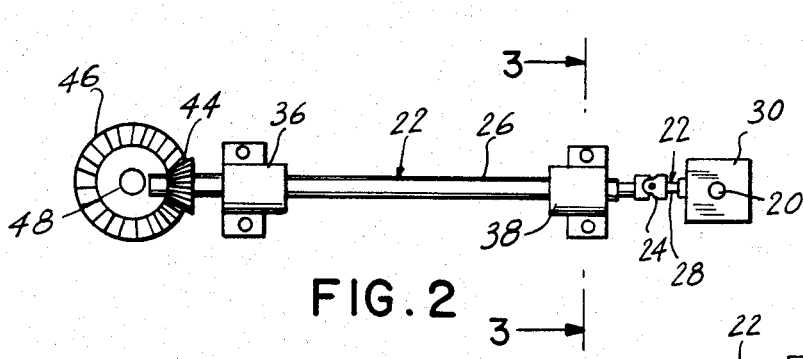
FIG. 2 is an enlarged side view of the drive mechanism separated from the frame of the bicycle.
Figure 3:
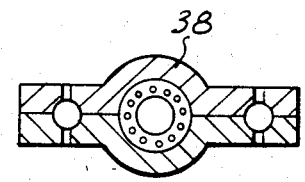
FIG. 3 is an enlarged cross sectional view taken along line 3—3 in FIG. 2 of the bearing block.
Figure 4:
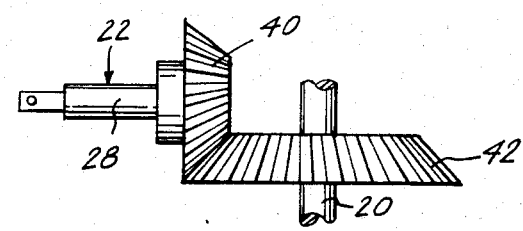
FIG. 4 is a partial top view of just the gear drive within the gear box housing.

Turning now descriptively to the drawings, in which similar reference characters denote similar elements throughout the several views, FIGS. 1 through 4 illustrates an improved bicycle 10 of the type that has a frame 12 with a seat stay 14 and a seat tube 16, a drive wheel 18 and a crank axle 20. The invention is the improvement that consists of a drive shaft 22 and a universal joint 24.

The drive shaft 22 is for transmitting motion from the crank axle 20 to the drive wheel 18. The drive shaft 22 is composed of two sections 26, 28 with the universal joint 24 connecting proximal ends of the drive shaft sections together.

The improved bicycle 10 further contains a gear box housing 30, a pair of support arms 32, 34 and a pair of bearing blocks 36, 38. The front section 28 of the drive shaft 22 is provided at its forward end with a bevel pinion 40 which is in mesh with a bevel gear 42 secured to the crank axle 20 within the gear box housing 30 so as to receive motion therefrom. The gear box housing 30 is mounted to proximal end of the seat tube 16.

The pair of support arms 32, 34 extend parallel between the drive shaft 22 and affixed at proximal ends to the seat stay 14 and said gear box housing 30. The bearing blocks 36, 38 are mounted transversely across the support arms 32, 34 to rotatably hold rear section 26 of the drive shaft 22 in position.

The rear section 26 of the drive shaft 22 is provided at its reaward end with a bevel pinion 44, which is in mesh with a bevel gear 46 secured to an axle 48 of the drive wheel 18, so as to receive motion therefrom.

Figure 5:
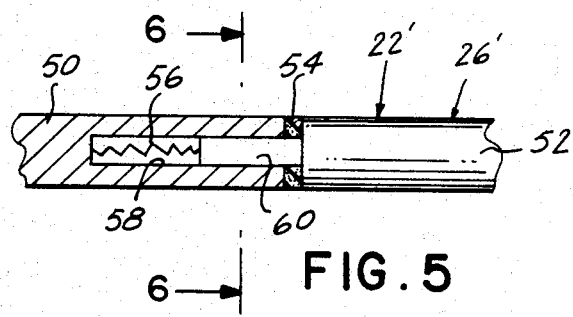
FIG. 5 is a partial side view with parts broken away of a modification showing an adjustable rear section of the drive shaft.
Figure 6:
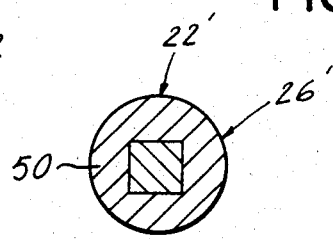
FIG. 6 is a transverse cross section taken along 6—6 in FIG. 5 showing the internal structural shape therein.

FIGS. 5 and 6 show a modified drive shaft 22' wherein the rear section 26' is adjustable and further contains a first shaft member 50, a second shaft member 52, a flexible grommet 54 and a spring 56.

The first shaft member 50 has a square shaped internal recess 58 and the second shaft member 52 has a square shaped extension rod 60 to slideably engage the recess 58 in the first shaft member 50. The flexible grommet 54 is mounted over the extension rod 60 of the second shaft member 52 to butt against the proximal ends of the first and second shaft members. The spring 56 is mounted to bottom of the recess 58 in the first shaft member 50 and to end of the extension rod 60 so as to bias the first and second shaft members together.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. An improved bicycle of the type having a frame with a seat stay and a seat tube, a drive wheel and a crank axle wherein the improvement comprises:
    (a) a drive shaft for transmitting motion from said crank axle to said drive wheel, said drive shaft composed of two sections;
    (b) a universal joint connecting proximal ends of said drive shaft sections together;
    (c) a gear box housing for said crank axle, said gear box housing is mounted to the proximal end of said seat tube;
    (d) a pair of support arms extending parallel between said drive shaft and affixed at proximal ends to said seat stay and said gear box housing;
    (e) a pair of bearing blocks, each said bearing block mounted transversely across said support arms to rotatably hold a rear section of said drive shaft in portion wherein said rear section of said drive shaft is adjustable and further comprises:

(a) a first shaft member having a square shaped internal recess;
(b) a second shaft member having a square shaped extension rod to slideably engage said recess in said first shaft member;
(c) a flexible gromment mounted over said extension rod of said second shaft member to butt against proximal ends of said first and second shaft members; and
(d) a spring mounted to the bottom of said recess in said first shaft member and to the end of said extension rod so as to bias said first and second shaft members together.

* * * * *